(12) United States Patent
Joret et al.

(10) Patent No.: US 9,938,897 B2
(45) Date of Patent: Apr. 10, 2018

(54) AIR INLET STRUCTURE FOR A TURBOJET ENGINE NACELLE OF LAMINAR TYPE

(71) Applicant: Aircelle, Gonfreville l'Orcher (FR)

(72) Inventors: Jean-Philippe Joret, Beuzeville (FR); André Baillard, Bretteville de Grand Caux (FR)

(73) Assignee: AIRCELLE, Gonfreville l'Orcher (FR)

( * ) Notice: Subject to any disclaimer, the term of this patent is extended or adjusted under 35 U.S.C. 154(b) by 215 days.

(21) Appl. No.: 14/496,518

(22) Filed: Sep. 25, 2014

(65) Prior Publication Data
US 2015/0007896 A1  Jan. 8, 2015

Related U.S. Application Data

(63) Continuation of application No. PCT/FR2013/050610, filed on Mar. 21, 2013.

(30) Foreign Application Priority Data

Mar. 29, 2012 (FR) ...................... 12 52815

(51) Int. Cl.
B64D 33/02 (2006.01)
F02C 7/045 (2006.01)
(Continued)

(52) U.S. Cl.
CPC ............. F02C 7/045 (2013.01); B64D 29/00 (2013.01); B64D 29/06 (2013.01); B64D 33/02 (2013.01);
(Continued)

(58) Field of Classification Search
CPC ........ B64D 29/00; B64D 33/02; B64D 29/06; B64D 2033/0206; B64D 2033/0286;
(Continued)

(56) References Cited

U.S. PATENT DOCUMENTS 3,166,149 A * 1/1965 Hulse ........................ E04B 1/86
                                                      181/292
5,941,061 A * 8/1999 Sherry ................... B64D 29/08
                                                       244/54
(Continued)

FOREIGN PATENT DOCUMENTS

| EP | 0 898 063 A1 | 2/1999 |
| EP | 2 344 385 | 7/2011 |
| FR | 2 906 568 A1 | 4/2008 |

OTHER PUBLICATIONS

International Search Report dated May 6, 2013 in International Application No. PCT/FR2013/050610.

*Primary Examiner* — Pascal M Bui Pho
*Assistant Examiner* — Thuyhang Nguyen
(74) *Attorney, Agent, or Firm* — Burris Law, PLLC

(57) ABSTRACT

An air intake structure for a turbojet engine nacelle includes an inner panel to be attached to a fan casing, and an external panel capable of a translational movement in a longitudinal direction of the nacelle. The external panel incorporates a portion of an air inlet lip able to provide a junction between the inner panel and the external panel, and each of the air inlet lip portion and the inner panel is equipped, at least in the region of a joining end, with an acoustic attenuation structure. In particular, at least one of the joining ends is equipped with a radial buffer able to come into contact with a corresponding joining flange exhibited by the other joining end when the external panel is in a closed position.

10 Claims, 5 Drawing Sheets

(51) Int. Cl.
    *B64D 29/06* (2006.01)
    *F02C 7/20* (2006.01)
    *B64D 29/00* (2006.01)
(52) U.S. Cl.
    CPC ........ *F02C 7/20* (2013.01); *B64D 2033/0206* (2013.01); *B64D 2033/0286* (2013.01); *F05D 2230/64* (2013.01); *Y10T 137/0536* (2015.04)
(58) Field of Classification Search
    CPC .... B64D 2033/0268; F02C 7/04; F02C 7/045; F02C 7/20; F05B 2260/96
    See application file for complete search history.

(56) References Cited

U.S. PATENT DOCUMENTS

| | | | | |
|---|---|---|---|---|
| 6,123,170 | A * | 9/2000 | Porte | B64D 33/02 |
| | | | | 181/198 |
| 6,284,322 | B1 * | 9/2001 | Nazaryan | C09D 163/00 |
| | | | | 427/386 |
| 6,340,135 | B1 * | 1/2002 | Barton | B64D 29/00 |
| | | | | 244/53 B |
| 6,892,526 | B2 * | 5/2005 | Stretton | B64D 29/00 |
| | | | | 244/53 B |
| 2010/0084507 | A1 * | 4/2010 | Vauchel | B64D 29/08 |
| | | | | 244/1 N |
| 2010/0148012 | A1 * | 6/2010 | McDonough | B64D 29/00 |
| | | | | 244/53 B |

* cited by examiner

AIR INLET STRUCTURE FOR A TURBOJET ENGINE NACELLE OF LAMINAR TYPE

CROSS-REFERENCE TO RELATED APPLICATIONS

This application is a continuation of International Application No. PCT/FR2013/050610, filed on Mar. 21, 2013, which claims the benefit of FR 12/52815, filed on Mar. 29, 2012. The disclosures of the above applications are incorporated herein by reference.

FIELD

The present disclosure relates to an air inlet structure for a turbojet engine nacelle.

BACKGROUND

The statements in this section merely provide background information related to the present disclosure and may not constitute prior art.

An aircraft propulsion assembly conventionally comprises a turbojet engine housed inside a nacelle.

The nacelle generally has an annular structure comprising an air inlet upstream of the turbojet engine, a median section intended to surround a fan of said turbojet engine and its casing, and a downstream section intended to surround the combustion chamber of the turbojet engine and accommodating if necessary thrust reversal means.

It may be terminated by an ejection nozzle of which the output is located downstream of the turbojet engine.

The air inlet structure is used to optimize the air capture needed to power the fan of the turbojet engine and channel it towards this fan.

An air inlet structure comprises in particular upstream a leading edge structure commonly called air inlet "lip".

The air inlet lip provides the air capture and is fastened to the rest of the air inlet structure which provides the channeling of the captured air towards the turbojet engine.

To do this, the rest of the air inlet structure has a substantially annular structure comprising an outer panel providing the outer aerodynamic continuity of the nacelle and an inner panel providing the inner aerodynamic continuity of the nacelle, in particular with the fan casing at the median section. The air inlet lip provides the junction between these two walls and may in particular be integrated to the outer panel.

Such nacelles comprising an air inlet lip integrated to the outer panel are called "laminar" and the outer panel/air inlet lip assembly can be movably mounted in translation along a longitudinal direction of the nacelle, in such a manner that it allows the upstream opening thereof. Such a nacelle is described in FR 2 906 568 and EP 2 344 385 documents, for example.

The inner surface of the air inlet structure is exposed to a significant air flow and is located in the vicinity of the blades of the fan. It is therefore located in a significant noise area.

In order to better remedy this situation and in order to reduce the noise pollution generated by the turbojet engine, the inner panel of the air inlet section is equipped with an acoustic attenuation structure.

This acoustic attenuation structure is in the form of a honeycomb core sandwich panel having a perforated outer skin, said acoustic skin, intended to be exposed to noise, and a full inner skin providing in particular the mechanical hold of the panel. The honeycomb core thus constitutes a resonator capable of trapping acoustic waves.

The air inlet lip may also be equipped with an acoustic attenuation structure on an inner portion of the latter.

In the case of a laminar nacelle having an outer mobile cover formed by the outer panel and the air inlet lip, there is a junction at the inner face of the air inlet structure between the inner end of the air inlet lip and the upstream end of the outer panel.

In order to provide the positioning, the centering and the locking of the movable structure on the inner fixed panel in operating position, the air inlet lip and the inner panel are equipped with junction flanges, locking means, seal members, an aerodynamic continuity flap, stoppers, etc. . .

This junction leads to a loss of the available acoustic surface related to the volume required for the implementation of these members, flaps, and stoppers, among others.

More specifically, the stoppers serve as centering device between the lip and the inner panel and are fixed on the panel on the air inlet lip side by means of screws, with an access on the nut side within a C closure. The same assembly principle is used for the aerodynamic flap.

The flange on the lip side is also used as a support for the setting of a peripheral seal member and also serves as a support for the stoppers and the aerodynamic flap. All these functions impact the beginning of the acoustic area on either side of said junction area.

Hence, there is a need for a solution for centering and maintaining such a structure to reduce the junction area not equipped with an acoustic attenuation structure.

SUMMARY

The present disclosure relates to an air inlet structure for turbojet engine nacelle comprising at least one inner panel intended to be fastened to a fan casing of the turbojet engine and to thus constitute a fixed part of said air inlet, and at least one outer mobile panel in translation along a substantially longitudinal direction of the nacelle and integrating a portion of air inlet lip capable of providing a junction between the inner fixed panel and the outer panel, said portion of air inlet lip and said inner fixed panel each being equipped at least at a junction end, with an acoustic attenuation structure, characterized in that at least one end of the junction is equipped with at least one radial buffer able to come into contact with a corresponding junction flange carried by the other junction end when the outer mobile panel is in the closed position.

Thus, by directly equipping the acoustic attenuation panels with centering members (buffer/flange), there is no more loss of acoustic surface due to the fastening of these members.

In one form, the buffer is integrated to the acoustic panel from its junction end. Alternatively, the buffer may be added, in particular by gluing.

In another form, the corresponding flange is integrated to the acoustic panel from its junction end. Alternatively, it may also be added, in particular by gluing. Advantageously, the structure comprises several buffers distributed over a circumference of the junction end.

Advantageously, at least one of the contact surfaces of the buffer and the flange is equipped with a coating of low friction coefficient. It may in particular consist of a teflon type coating.

Such a coating, teflon strip or other, allows obtaining a coating with a low friction coefficient which can thus serve as a wear part.

The junction of acoustic panels is equipped with at least one member forming aerodynamic flap in one form of the present disclosure.

In still another form, the junction is equipped with at least one seal member. Advantageously, the seal member is located between an acoustic panel, and the flange.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
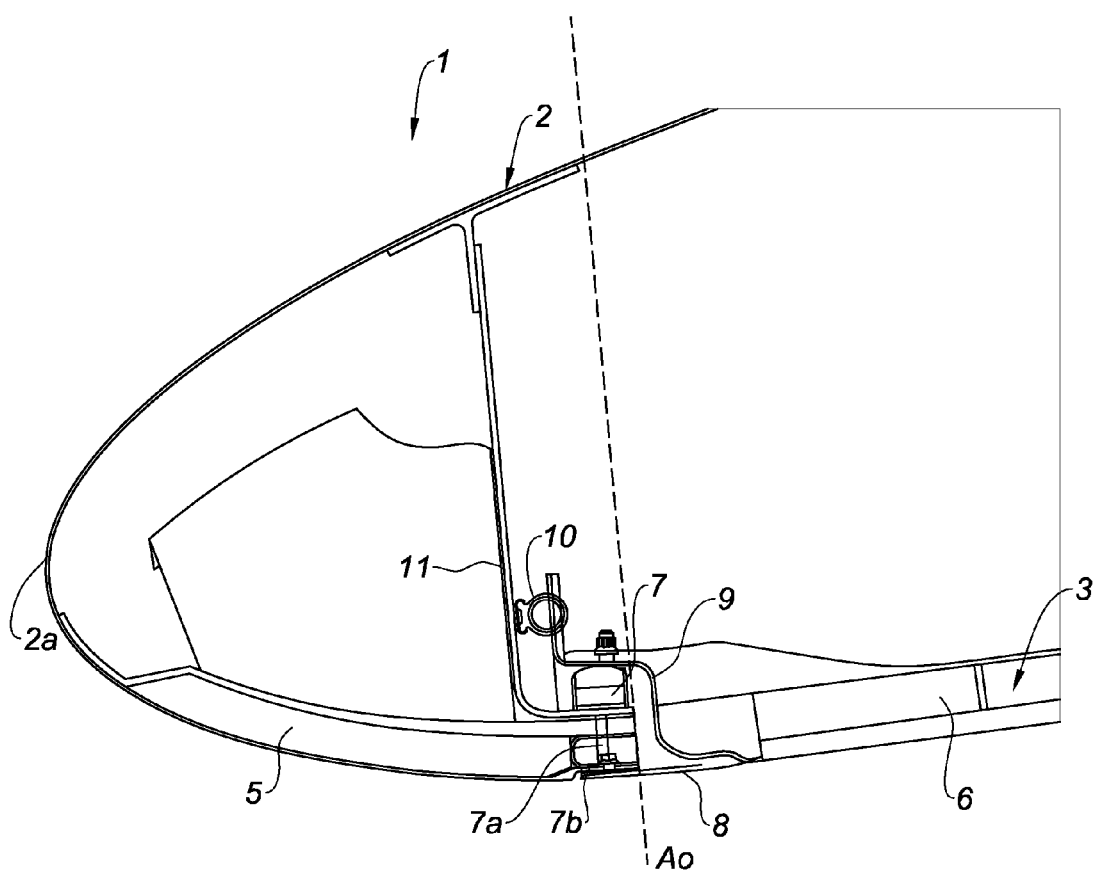
FIG. 1 is a partial schematic representation in longitudinal section of an air inlet structure called "laminar" equipped with a centering device according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is particularly applicable to the nacelles called "laminar" having an air inlet structure 1 of which an outer wall 2 is movably mounted in translation along a longitudinal direction of the nacelle and integrates a portion of air inlet lip 2a.

More specifically, such an air inlet structure for a turbojet engine nacelle comprises at least one inner panel 3 intended to be fastened to a fan casing (not shown) of the turbojet engine and to thus constitute a fixed portion of said air inlet 1, and at least one outer panel 2 movable in translation along a substantially longitudinal direction of the nacelle and integrating a portion of air inlet lip 2a able to provide a junction A0 between the inner fixed panel 3 and the outer panel 2.

Furthermore, said air inlet lip 2a portion and said inner fixed panel 3 are each equipped at least at a junction end, with an acoustic attenuation structure being in the form a honeycomb core sandwich panel 5, 6.

According to the prior art and such as shown in FIG. 1, the centering of the outer wall 2 and of the air inlet lip 2a with the inner panel 3 is provided at a junction A0 between said portion of air inlet lip 2a and said inner wall 3 by means of buffers 7 fixed in the acoustic panel 5 on the lip 2a side via a screw 7a with a nut side access inside a C closure 7b.

An aerodynamic flap 8 providing the stream of air flow at the junction between the panels is fixed according to the same principle.

A flange 9 fixed in the inner panel 3 comes, during the closing of the outer panel 2, to bear against a member 10 carried by a corresponding flange 11 of the air inlet lip 2a portion in order to provide the sealing of the inside of the air inlet structure 1. This flange also allows a support for the buffers 7 and for the aerodynamic flap 8.

As explained above, these functions impact the beginning of the acoustic areas both on the air inlet lip 2a portion and on the outer panel 3. Thus, the acoustic panels 5, 6 must be generally stopped before the actual junction A0 between these two structures. This results in a loss of acoustic surface, and thus, in an area where it is particularly needed.

Thus, there is a need for a centering and closure solution to retain acoustic panels extending at the most to junction A0 between the air inlet lip 2a portion and the inner panel 3.

Figure 2:
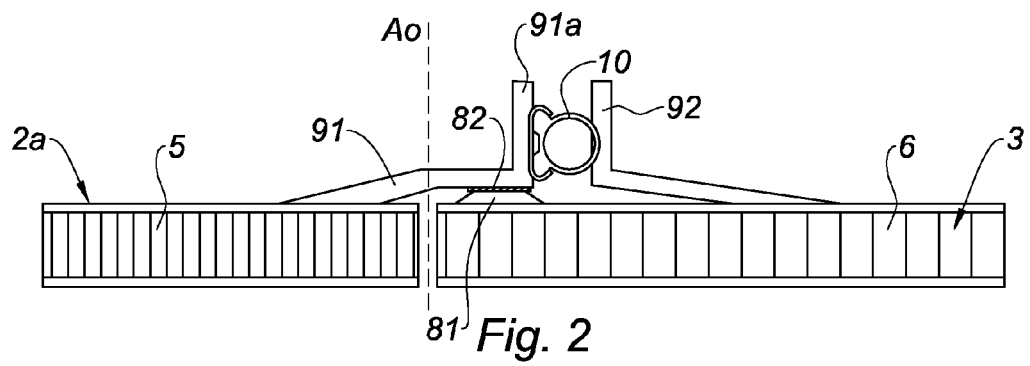
FIGS. 2 and 3 are partial schematic representations in longitudinal section of a junction between an inner panel and a portion of air inlet lip equipped with a centering system according to the present disclosure.
Figure 3:
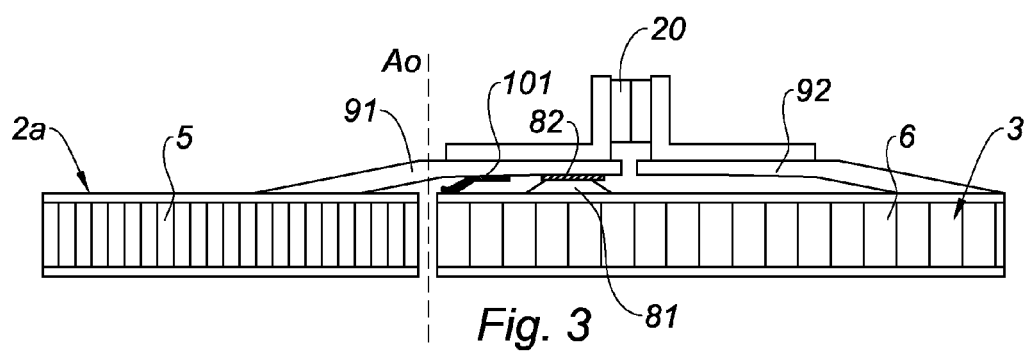

As schematically shown in FIGS. 2 and 3, the acoustic panel 6 of the inner panel 3 has a junction end equipped with a radial buffer 81 on which a corresponding junction flange 91 is able to rest, equipping a junction end of the acoustic panel 5 of the air inlet lip 2a portion when the latter is in the closed position.

The buffer 81 carries a coating strip 82 of teflon type with a low friction coefficient. Alternatively, the coating strip 82 with a low friction coefficient may be carried by the junction flange 91.

This coating strip has a double function, namely of reducing frictions during the closing of the air inlet, and of wear part.

The coating strip may be disposed either on the buffer side 81, or fixed under the flange 91, or be present on both members.

In order to provide the sealing of the inside of the air inlet structure 1, the junction flange 91 has a return 91a of an end carrying a seal member 10 able to cooperate with a corresponding sealing flange 92 carried by the inner panel in FIG. 2.

In one form, a seal member 101 in FIG. 3 may be mounted at the junction end of the inner panel 3 and come into contact with the junction flange 91 in order to provide the sealing closest to said junction A0. The member 101 may be integrated or added on the junction flange 91 in particular to press against the inner panel 3 during the closure.

The junction flange 91 and the flange 92 of the inner panel 3 may thus be used for the setting up of axial stops 20 and/or locks between the lip portion 2a/outer panel 2 and the inner panel 3.

In another form, the seal member 10, 101 will be placed on the entire circumference of the structure.

The buffers 81 will also be advantageously disposed along the circumference of the structure 1 and could be distributed discretely, advantageously in a uniform manner. Of course, it may also consist of a continuous buffer 81 substantially along the entire circumference.

As seen in the Figures, by means of the present disclosure the beginnings of the acoustic surfaces of the air inlet lip 2a portion and of the inner panel 3 are closest to the junction A0 between these two panels, thus improving the acoustic treatment of the entire air inlet structure 1.

Of course, the opposite arrangement (buffer 81 on the lip portion 2a, and junction flange 91 on the inner panel 3) is also possible.

The junction A0 between the air inlet lip 2a portion and the inner panel 3 can also be equipped with a seal forming aerodynamic flap 102.

Its setting up is detailed in FIGS. 4a, 4b, 5a, 5b and 6a to 6d.

The aerodynamic flap 102 has a flexible elastic structure mounted on an upper skin of an acoustic panel 5 of the air inlet lip 2a portion.

The flap 102 extends along the thickness of said acoustic panel 5 at its junction end A0 and has a lower return 102a extending on either side of said junction A0, both on the air inlet lip 2a portion and on the inner panel (not shown on FIGS. 4a, 4b, 5a, 5b), thus providing an aerodynamic overlap of the junction.

Figure 4A:
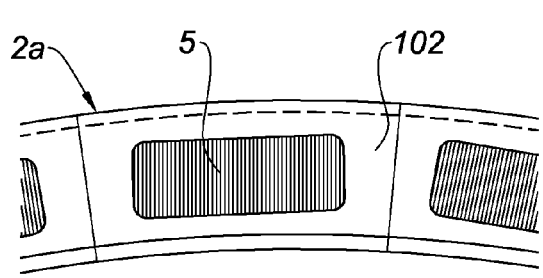
FIGS. 4a, 4b, 5a, 5b and 6a to 6d are partial schematic representations of the steps for setting up a member forming aerodynamic flap.
Figure 4B:
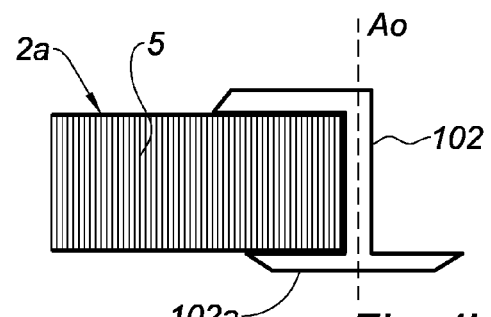
Figure 5A:
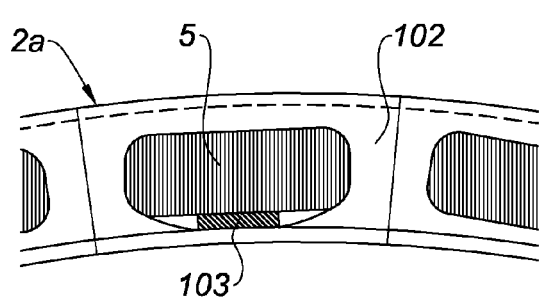
Figure 5B:
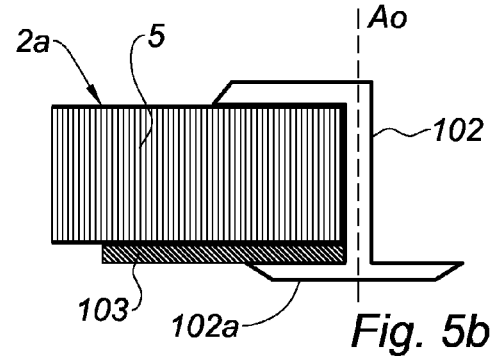
Figure 6A:
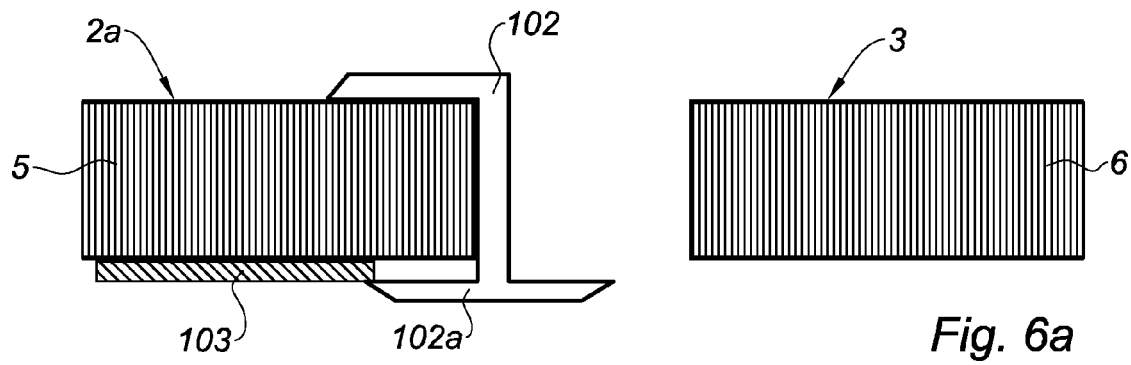
Figure 6B:
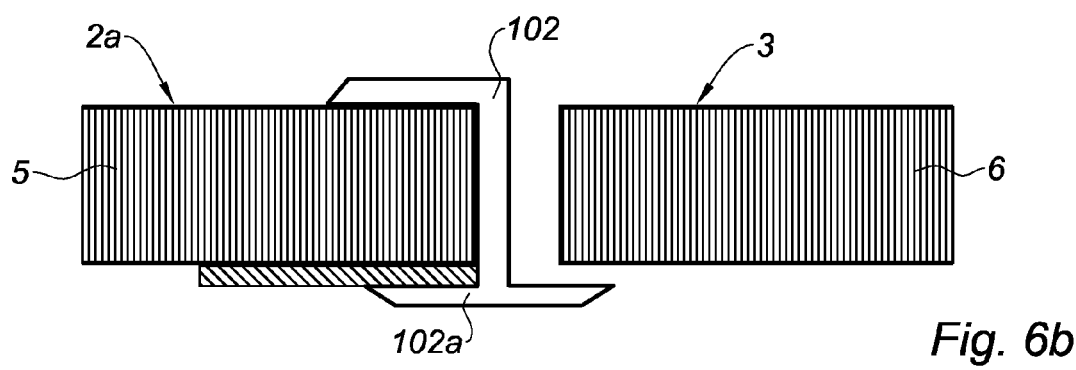
Figure 6C:
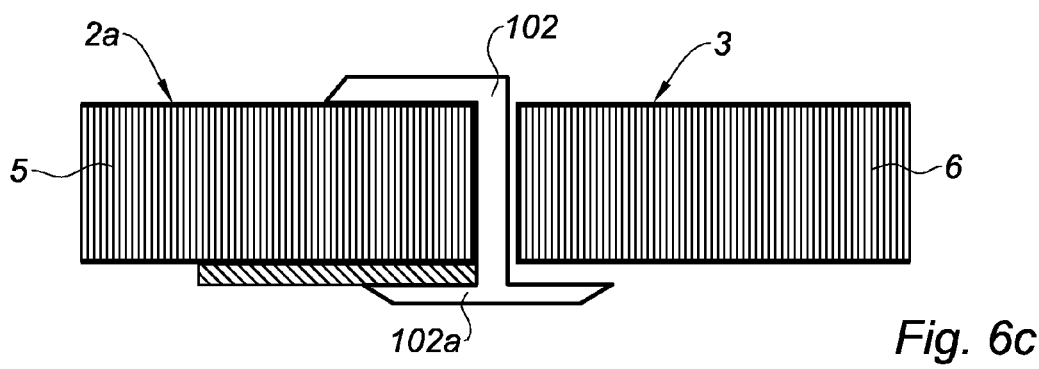
Figure 6D:
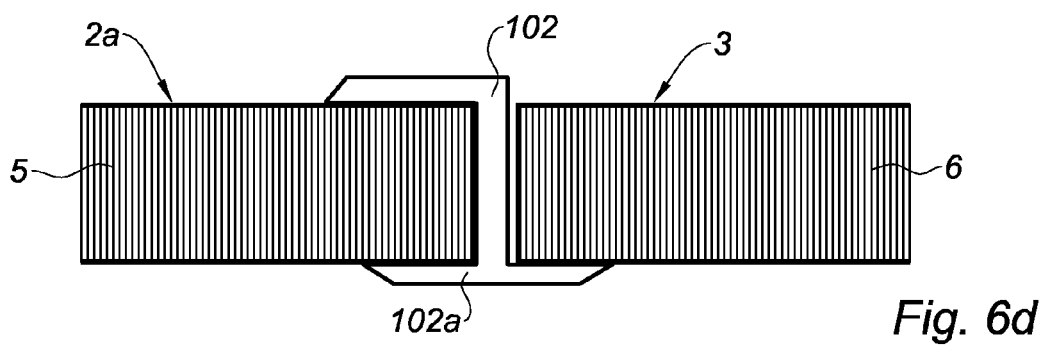

FIGS. 4a and 5a are front cross-sectional views of said seal 102 forming aerodynamic flap.

The setting up of the seal 102 around the thickness of the acoustic panel of the air inlet lip 2a portion will be carried out by means of a mounting wedge 103.

As visible in FIGS. 6a to 6d, a lower part of the flap (vein side) spaces apart from the acoustic panel and allows the mounting of the acoustic panel belonging to the inner panel.

FIGS. 7 to 9 and 10a to 10d are views of a second form of an air inlet structure 110 according to the present disclosure in which the buffers 81 belong to the acoustic panel 5 of the lip portion 2a and the junction flange 91 belongs to the acoustic panel 6 of the inner panel 3.

Figure 7:
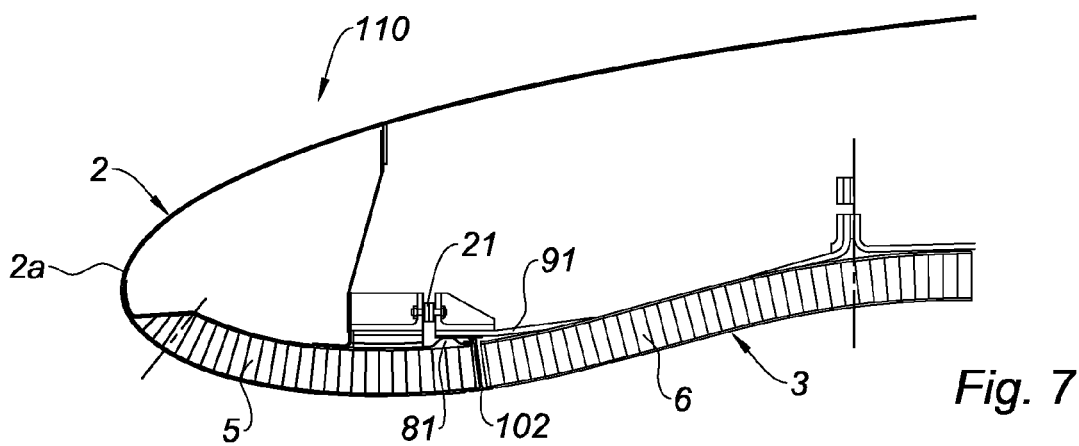
FIGS. 7 and 8 are schematic representations in longitudinal sections of an alternative form of the present disclosure.
Figure 8:
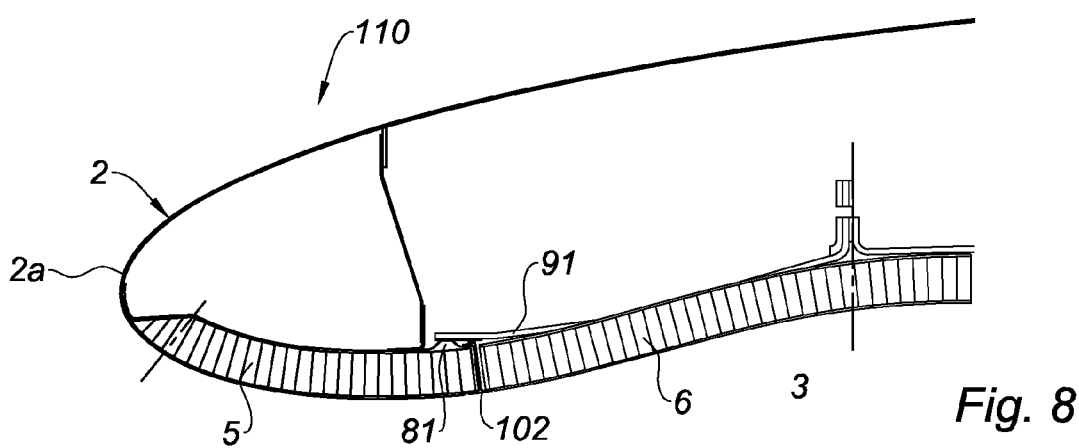

More specifically, FIG. 7 is a view in longitudinal section substantially taken at the locking means 21 (or axial stops 20). The FIG. 8 is a view in longitudinal section taken in current section.

Figure 9:
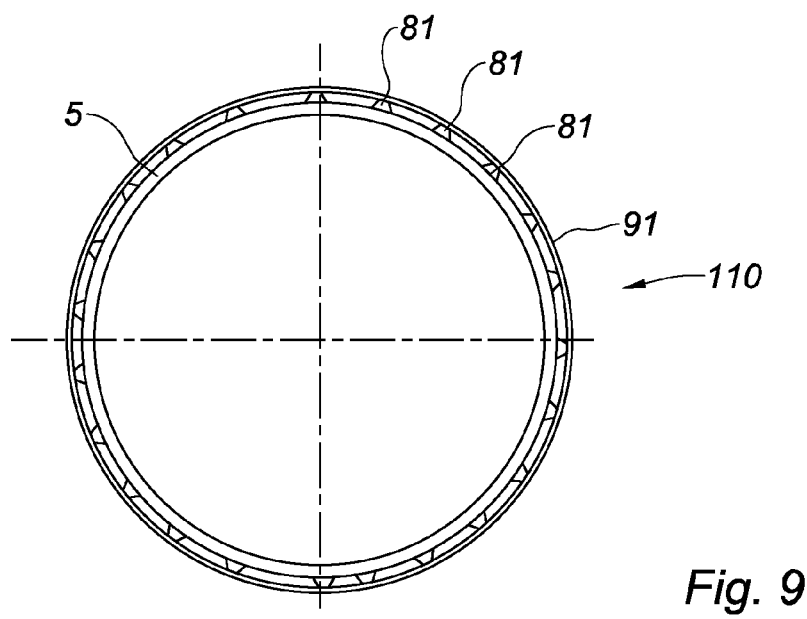
FIG. 9 is a schematic representation in cross-section corresponding to the air inlet structure of FIGS. 7 and 8.

FIG. 9 is a front cross-sectional view in current section.

FIGS. 10a to 10d are substantially equivalent to FIGS. 6a to 6d and illustrate the setting up of the seal 102 forming aerodynamic flap.

Figure 10B:
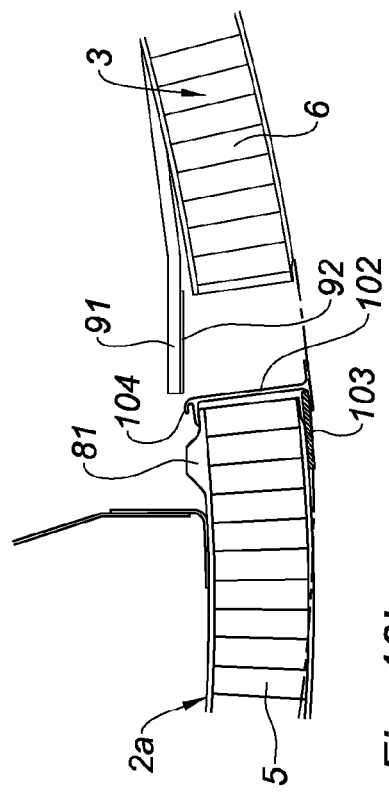
FIGS. 10a to 10d are partial schematic representations of the setting up of the member forming aerodynamic flap.
Figure 10D:
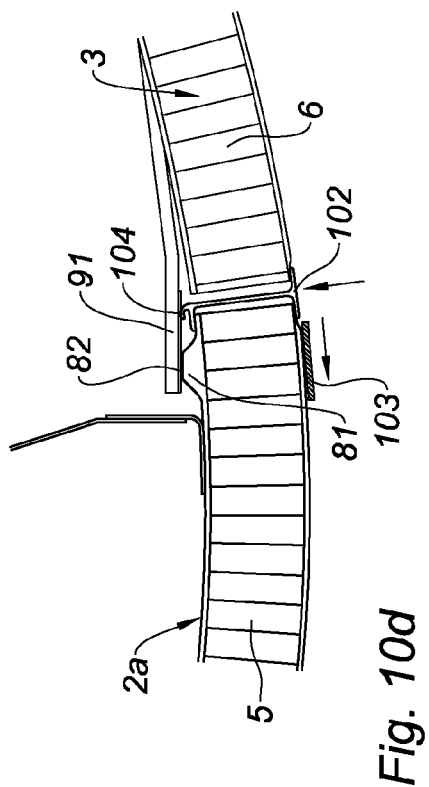
Figure 10A:
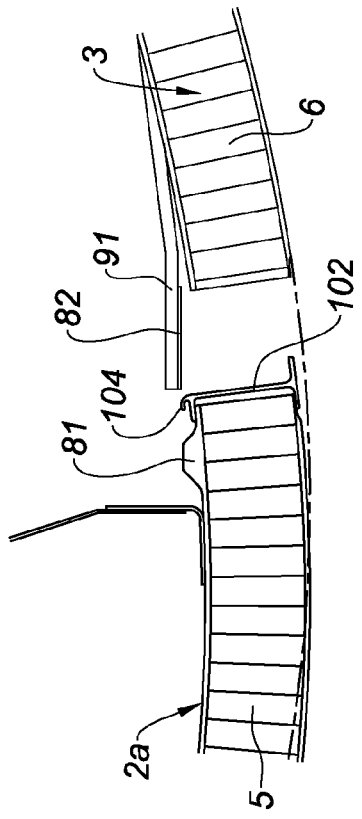
Figure 10C:
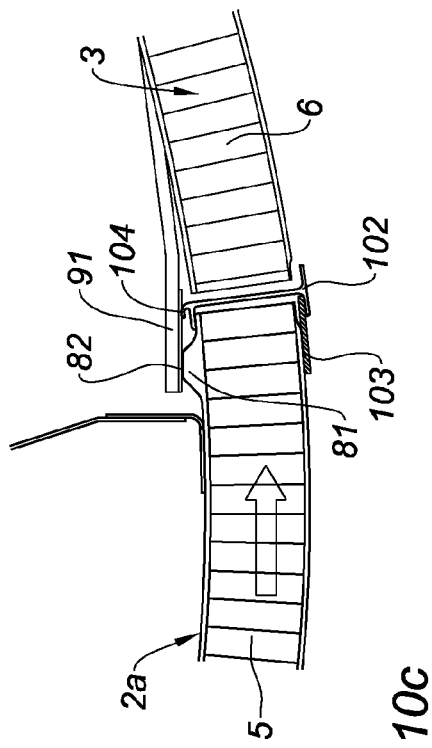

It is also worth noting that in this form, the seal 102 also achieves the function of the seal member 10 and 101 by means of an upper tab 104 which comes into contact against the junction flange 91 during the closing of the structure (closing direction shown by the arrow on FIG. 10c).

Although the present disclosure has been described with a particular form, it is obvious that it is in no way limited thereto and that it comprises all the technical equivalents of the described means as well as their combinations should these fall within the scope of the present disclosure.

It is in particular noteworthy that the translatable air inlet generally forms an adjustable removable sleeve on a duct formed by the basic structure of the nacelle. Thus, the centering and sealing system object of the present disclosure can be generally applied to any type of removable sleeve sought to be positioned in a centered and sealed manner on one end of a duct.

What is claimed is:

1. An air inlet structure for a turbojet engine nacelle of a turbojet engine comprising:
    at least one inner panel fastened to a fan casing of the turbojet engine, said at least one inner panel forming an inner fixed part of said air inlet structure, said at least one inner panel including a sealing flange; and
    at least one outer mobile panel configured to translate during a maintenance operation along a longitudinal direction of the nacelle, said at least one outer mobile panel integrating a portion of an air inlet lip configured to provide a junction between said at least one inner panel and said at least one outer mobile panel,
    wherein each of said portion of the air inlet lip and said at least one inner panel has a junction end, and each of the junction end is equipped with an acoustic attenuation panel,
    wherein one of the junction ends is equipped with a plurality of radial buffers on an inner surface of its respective corresponding acoustic attenuation panel, and all the other of the junction ends comprises a respective junction flange on an inner surface of the other acoustic attenuation panel, wherein each of the respective junction flange slides over and rests on the plurality of radial buffers when the at least one outer mobile panel is translated and comes to a closed position, wherein the plurality of radial buffers are uniformly distributed around a circumference of the air inlet structure,
    wherein a sealing member is disposed between each of the respective junction flange and the sealing flange of the at least one inner panel to provide sealing inside the air inlet structure, and
    wherein the junction between said at least one inner panel and said at least one outer mobile panel is equipped with at least one seal forming an aerodynamic flap that provides continuity of an outer surface of the air inlet structure.

2. The structure according to claim 1, wherein the plurality of radial buffers is integrated with the corresponding acoustic attenuation panel.

3. The structure according to claim 1, wherein the junction flange rests on the plurality of radial buffers.

4. The structure according to claim 1, wherein each of the respective junction flange comprises a return carrying the sealing member.

5. The structure according to claim 1, wherein each of respective junction flange is integrated with the other acoustic attenuation panel from the junction end.

6. The structure according to claim 1, wherein at least one of a contact surface of the plurality of buffers and each of the respective junction flange is equipped with a coating with a friction coefficient which serves as a wear part.

7. The structure according to claim 1, wherein the aerodynamic flap extends along a thickness of each of the respective acoustic attenuation panel at the junction end between each of said portion of the air inlet lip and said at least one inner panel and comprises a lower return.

8. The structure according to claim 1, wherein at least one of the junctions is equipped with at least one of the sealing member.

9. The structure according to claim 8, wherein each of the respective junction flange integrates said at least one of the sealing member configured to press against said at least one inner panel.

10. The structure according to claim 8, wherein the at least one of the sealing member is located between said one of the junction ends equipped with the plurality of radial buffers and each of the respective junction flange of the other of the junction ends.

* * * * *